Oct. 21, 1969         A. C. PRIOR         3,473,217
MANUFACTURE OF SUPERCONDUCTORS
Filed Feb. 24, 1965         5 Sheets-Sheet 1

3,473,217
MANUFACTURE OF SUPERCONDUCTORS
Arthur Cunningham Prior, Malvern, England, assignor to National Research Development Corporation, London, England
Filed Feb. 24, 1965, Ser. No. 434,924
Claims priority, application Great Britain, Feb. 25, 1964, 7,865/65; Mar. 5, 1964, 9,353/65
Int. Cl. H01s 4/00; B22f 3/24
U.S. Cl. 29—599　　　　　　　　　　　　　　6 Claims

ABSTRACT OF THE DISCLOSURE

A superconducting article, such as a solenoid, is made by assembling starting material in a form suitable for conversion by heat treatment into the desired article. The starting material may be in the form of particles of the desired alloy or of constituents thereof. The starting material may include a layer of one metal coated upon another and, in this case, the metal to be coated may be provided by evaporation coating followed by electrodeposition.

---

The present invention relates to the manufacture of superconductors. By "superconductors" in the present specification is meant superconductors made of a material which can be made superconducting at a low temperature, for example 4° K. Such a material is the alloy niobium-tin, roughly of the composition $Nb_3Sn$. This material has the disadvantage that it is extremely brittle to handle and if a wire is made of it the wire cannot be wound into a solenoid or even bent unless the wire is extremely thin.

It is an object of the invention to overcome these difficulties by forming any bends required in the material of which the wire is to be made before manufacture of the wire itself.

According to the present invention a manner of manufacturing an alloy superconductor includes the steps of assembling the constituents of the alloy in a form suitable for heat treatment for conversion into the alloy, forming the assembly into a convenient shape and heat treating the assembly while holding it in the form and shape required whereby the constituents combine together to produce the alloy superconductor.

The alloy superconductor may be niobium-tin, and the constituents niobium and tin.

According to the invention in one aspect a manner of manufacturing a solenoid of an alloy superconductor comprises the steps of inserting starting material in particulate form into a spiral jig and heat treating the assembly whereby the starting material is converted into the alloy superconductor.

The starting material may consist of niobium and tin or the alloy niobium-tin in particulate form.

According to the invention in another aspect constituents of the alloy are assembled in alternate layers of different constituents or in layers consisting of one constituent deposited on a piece of another constituent.

For example, a niobium tape may be tin plated in a manner to be described. The layer of tin may be thickened by electroplating and the material of the electroplated tape may be converted into niobium-tin by heat treatment.

Embodiments of the invention will be described by way of example and with reference to the accompanying drawings, in which.

Figure 1:
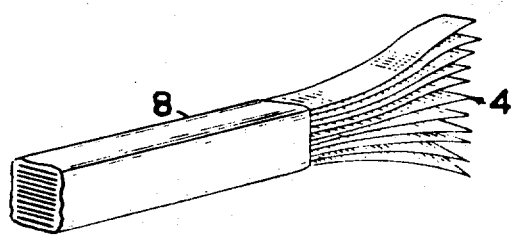
FIGURE 1 is a perspective diagram of an assembly of tapes partially drawn through a tube.

FIGURE 1 is a perspective diagram of an assembly of tapes 4 partially drawn through a tube 8. The tube 8 is a thin walled tube of niobium which has been drawn through a die to make it approximately rectangular, say 0.070″ x 0.045″ inside. The tapes 4 are 26 in number, thirteen of niobium (say 0.060″ x 0.002″) alternating with thirteen of tin (say 0.060″ x 0.001″). As an alternative to the use of separate tapes of niobium and tin, composite tapes formed, for example, by depositing layers of tin or niobium tape by a suitable process may be used. The tapes are drawn into the tube 8 by being formed into a loop and threaded with strong wire, for example, tungsten wire, or by any other convenient method. The internal dimensions of the tube are slightly greater than the dimensions of the tape to allow easy drawing in. The composite structure may be drawn down slightly to tighten the contents within the tube. The structure may be bent or wound into solenoid form or otherwise manipulated. The alloy $Nb_3Sn$ is formed by subsequent heat treatment of the tube.

In an alternative embodiment tapes of suitable type may be assembled and held together by some means other than by the use of a tube as for example by winding the assembled tapes round a former and then holding them in this position during heat treatment by a covering foil of suitable material.

Figure 4:
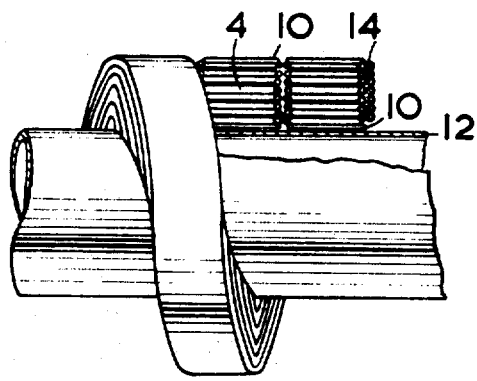
FIGURE 4 is a diagram, partly in cross-section, of part of a superconductor solenoid.

A suitable arrangement is shown in FIGURE 4, which is a diagram, partly in cross-section, of part of a superconductor solenoid. A tape 10 of molybdenum is coated with a layer of silica, glass, ceramic or other refractory material for electrical insulation. In winding the assembled tapes 4 on a former 12 one such molybdenum tape 10 may be placed on one or both sides of the assembled tapes 4 as illustrated in FIGURE 4. Where the resulting electrical time constant of the completed solenoid would not thereby be made too great uncoated molybdenum tapes could be used. The molybdenum wires 14 may be used for lateral separation of neighbouring turns as illustrated.

In making a complete solenoid by this method the number of superconducting foils in each layer may be varied, additional tapes introduced in the winding being interleaved, so that a suitable joint is formed on subsequent heat treatment. In this way the effective cross section of the composite wire can be varied in the optimum way to suit the local conditions in the solenoid. For example, since the maximum superconducting current density which a superconductor can accommodate depends on the magnetic field in which the superconductor lies, it is generally convenient for parts of a superconducting circuit lying in a higher magnetic field (for example, the inner turns of a solenoid) to be made with a larger cross-sectional area. It is also convenient to thicken parts of a superconducting circuit to which connections must be made.

Figure 2:
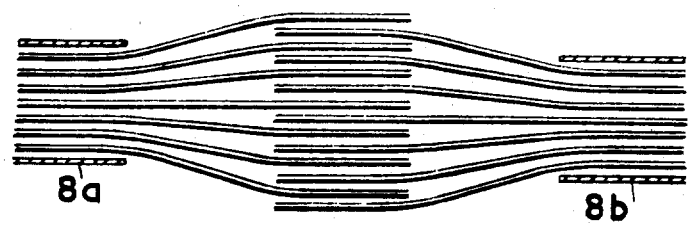
FIGURE 2 is a cross-sectional diagram of a joint between two wires.

FIGURE 2 is a cross-sectional diagram of a joint between two wires. Before heat treatment the containing tubes 8a, 8b, if used, are opened and the pairs of foils are interleaved. The spliced joint is held together by suitable material (for example by wrapping with wire or foil). On heat treatment a reliable joint results.

Figure 3:
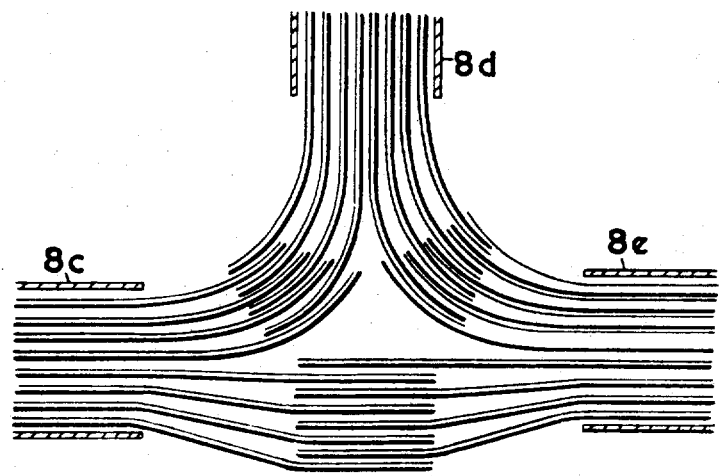
FIGURE 3 is a cross-sectional diagram of a joint between three wires.

FIGURE 3 is a cross-sectional diagram of a joint between three wires. Before heat treatment each containing tube such as 8c is opened and the pairs of foils are interleaved, some with one of the other tubes such as 8d and some with the other tube such as 8e. The rest of the process is the same as that described with reference to FIGURE 2.

Various other ways of making joints between three or more wires can be used. For example a wire made of tapes of width 0.120″ can be joined to two wires side by side made with tape of width 0.060″. Alternatively joints can be made between two or more wires by the use of additional foils of suitable shape which are interleaved with the tapes of the various wires being joined.

Figure 5:
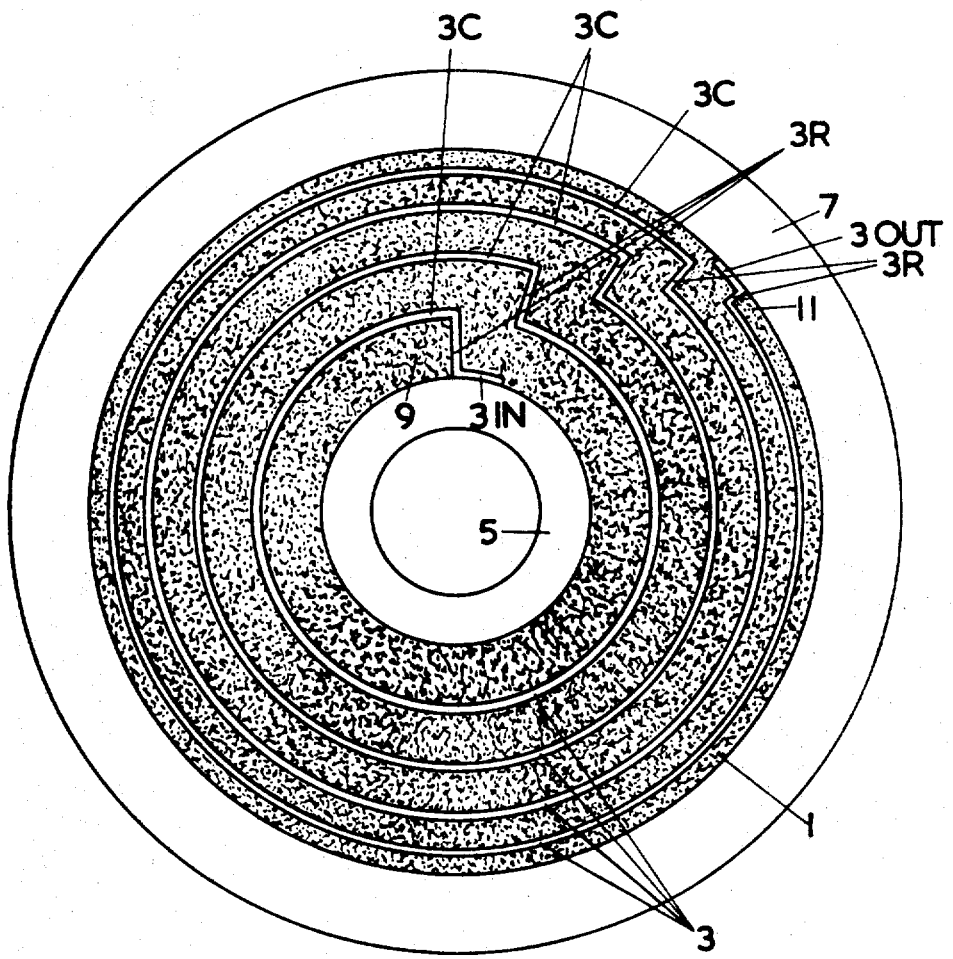
FIGURE 5 is a plan view of part of another superconductor solenoid.

In FIGURE 5, a mixture of powdered niobium and powdered tin in the ratio 3 gram-atoms of niobium to 1 gram-atom of tin is labelled 1. The mixture 1 is held in a spiral by a spiral of metal foil 3. For convenience of manufacture this spiral is composed of circular segments 3c and radial steps 3R as shown in FIGURE 5. The inward and outward extremities of the spirals 1 and 3 are bounded by washers 5 and 7, respectively. Extensions 3IN and 3OUT to the spiral 3 on its inner and outer ends, respectively, lie against the outer edge of the washer 5 and the inner edge of the washer 7 respectively. The purpose of these extensions is to prevent powder from squeezing between the ends of the foil 3 and the respective washers. The spiral 3 and the washers 5 and 7 together constitute a jig for holding the mixture.

The mixture 1 is converted into the compound niobium tin by the process of being compressed in a press (described below with reference to FIGURE 6) and subsequently heat treated. It is important that the material from which the jig consisting of the spiral 3 and the washers 5 and 7 is made is compatible both physically and chemically with niobium tin, i.e., that it will have a coefficient of expansion so similar to that of niobium tin that the niobium tin will not break on cooling from the temperature of heat treatment, about 1,000° C., to liquid helium temperature and that it will not to a significant extent react chemically with niobium tin at any temperature in this range. Titanium has been found to be a suitable material.

The assembly as a whole will be referred to hereinafter as a disk. In use a number of such disks are mounted parallel to one another with connections of niobium-tin made between them at the inner and outer extremities 9 and 11, respectively, of the spirals. The spirals are mounted back-to-back so that the connections can be alternately inner-inner and outer-outer with the magnetic field induced by the superconducting current always in the same direction.

To make the connections between one disk and another the two surfaces to be connected are first roughened by chipping away small portions of the compressed powder mixture. The disks are then held together in a suitable jig and pressure is applied with a suitable shaped press tool to the top disk in the region over which the joint is to be made. Before the last named tool is used the top surface of the disk which will be beneath the pressure applying member of the tool is also roughened and additional niobium and tin powder mixture is placed in a cavity in the tool through which the pressure applying member passes. In this way the two disks are joined and the additional powder is compressed and bonded to the material of the top disk, to replace material displaced by the pressure of the tool.

To ensure the absence of a superconducting path between one disk and another except in the region of contact, a layer of suitable material, such as powdered alumina sprayed on, may be placed on one or both disks before these are placed together. In like manner a series of disks may be joined one above another to make a solenoid of any desired length.

The method of making connections between the end disks of the solenoid and the external circuit will depend on the type of conductor to be used for the latter. If this conductor is to be composed of a compressed niobium and tin powder mixture the joint may be made in an analogous manner to that described above for joining one disk to another. Conveniently the wires composing the external circuit may be manufactured as described above with reference to FIGURE 1, or as described below with reference to FIGURE 7. The type of wire described above with reference to FIGURE 1 may be joined to the end disks of the solenoid by separating the constituent wires of foils, mixing these with a niobium and tin powder mixture, and compressing this mixture to make a joint with the disk.

In use the inner conductors, that is to say the conductors that lie towards the insides of the disks, will lie in higher magnetic fields than the outer conductors, that is to say those that lie towards the outside of the disks. The inner conductors must therefore be made with a larger cross-section to accommodate a given superconducting current density. In other words, for a given superconducting current density the most economical use of space and material is achieved by having a gradation between relatively thick inner conductors and relatively thin outer conductors.

Figure 6:
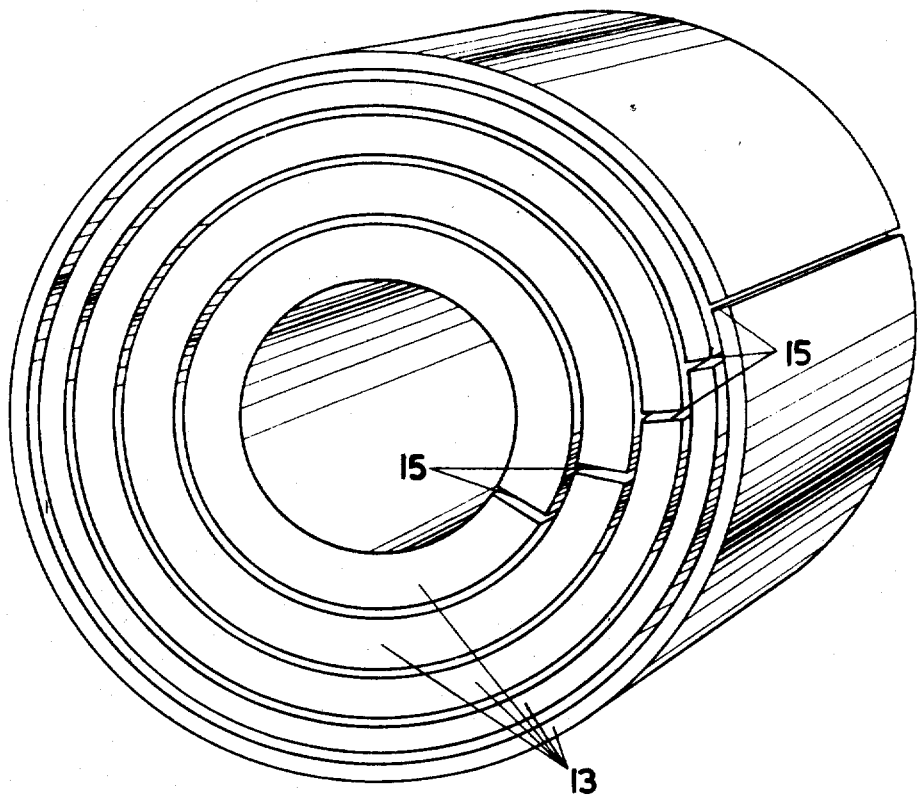
FIGURE 6 is a perspective drawing of part of a press used for making the part shown in FIGURE 4.

FIGURE 6 is a perspective view of part of a press used for making a disk such as that described with reference to FIGURE 5. A plurality of tubes 13, 13, . . . , 13 having ends cut square and polished are held concentrically with the ends coplanar. Slots 15, 15, . . . , 15 cut in the tubes and the spaces between the tubes are made the right size and shape to accommodate the metal foil 3 of FIGURE 5.

In the manufacture of disks such as are described with reference to FIGURE 4 washers such as the washers 5 and 7 are held in a suitable jig and the foil 3, of suitably greater width than the final thickness of the disk, is held between them in a part such as that described with reference to FIGURE 6. The interstices are filled with the powdered niobium-tin mixture and a further part similar to that described with reference to FIGURE 6 used to compress the powder. After the disk with the excess foil is removed from the jig the excess foil is trimmed away, and the disk may be machined to the desired precise thickness. The disk is then ready for assembly into a complete solenoid by jointing as described above. For added strength the whole solenoid may be assembled in an outer case of some suitable material such as titanium.

When the whole assembly including the connections to the solenoid is completed, the whole is heat treated in a suitable protective atmosphere to produce the alloy. The time and temperature of treatment will depend on the grade and state of subdivision of the niobium and tin powders used, but would typically be between 900° C. and 1,000° C. for from 1 to 16 hours.

As an alternative to the filling of the spiral illustrated in FIGURE 5 with the mixture of powdered niobium and powdered tin it may be filled with powdered niobium-tin or a partially reacted mixture of niobium and tin. When the whole assembly including the connections to the solenoid is completed, the whole is heat treated in a suitable protective atmosphere to produce a solenoid of the alloy. The time and temperature of treatment will depend (like the method described above) on the ground and state of subdivision of the niobium-tin powder used but would typically be between 900° C. and 1,000° C. for from one to sixteen hours.

Figure 7:
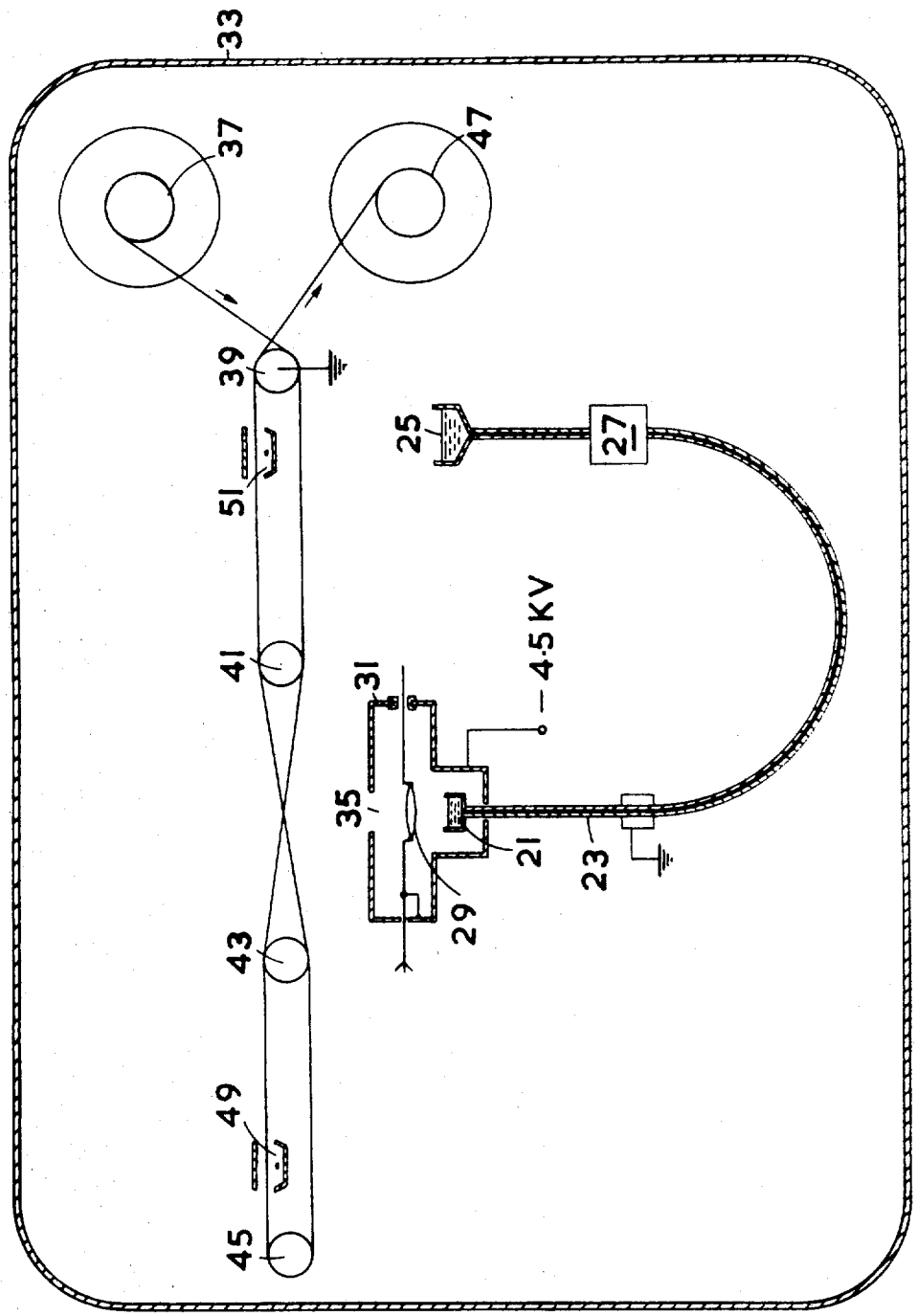
FIGURE 7 is a diagram in cross-section, of apparatus for tin plating by vacuum evaporation from a tin source.

A further method of making a superconductor will be described with reference to FIGURE 7, which is a diagram, partly in cross-section, of apparatus for tin plating by vacuum evaporation of a tin source.

An attractive method of making niobium-tin wire would appear to be by tin-plating niobium tape or wire and heat-treating the tin-plated tape or wire. However, it has proved extremely difficult to tin-plate niobium in the past. In the present apparatus the layer of tin is deposited by electron bombardment of a source of tin.

The source 21 of tin is connected via a tube 23 (made of molybdenum or titanium) to a reservoir 25 so that the source 21 may be continually replenished with liquid tin.

The source 21, the tube 23 and the reservoir 25 are all heated to keep the tin molten. This is shown schematically by a heater 27. The source 21 is maintained at earth potential.

A circular filament 29 made of 0.015 inch tungsten or tantalum wire is used as an emitter of electrons to bombard the source 21. A total current of some 20 amps A.C. is caused to flow in the filament 29. The filament 29 is supported within a hollow electrode 31 having the shape of the solid of revolution of a T about its vertical axis. The electrode 31 is maintained at a negative potential of −4,500 volts, and the filament 29 is connected to it. The whole assembly is held in an evacuated chamber or evacuated chambers. This is indicated schematically by an envelope 33.

In operation at a low rate of evaporation the source 21 is heated principally by bombardment of electrons ejected from the filament 29. In operation at a high rate of evaporation, however, the source 21 is heated by bombardment of electrons ejected by the filament 29, and also by an electric discharge passing through the ionised tin vapour directly between the electrode 31 and the source 21. In action the tin particles evaporated from the source 21 pass against the electron stream through a hole 35 in the electrode 31.

The niobium tape is wound off a reel 37, over four sets of pulleys 39, 41, 43 and 45 and (after coating) on a reel 47. To increase the speed of coating the pulleys may be multiple so that the tape passes many times over the evaporation source in such a way that both sides of the tape are coated.

In order to achieve a firmly adherent coating of tin it is necessary for the tape to be heated to some 400–500° C. either during or after coating. If the tape is passing slowly over the source it becomes heated sufficiently by radiation and electron bombardment from the filament but at a more rapid passage this heating is not sufficient. The heating can then be conveniently done in the coating apparatus by means of subsidiary electron bombardment heaters 49, 51 which heat the tape after deposition on each pass and before the deposit can be rubbed off by passage over a pulley.

In an alternative arrangement for rapid coating of a large quantity of tape as an alternative to the large number of passes of a single tape a number of separate lengths of tape could be simultaneously passed over the source or over a pair of source to coat both sides. Each tape would then pass more slowly over the source.

A very thin layer of tin deposited by the process described above is adequate to act as a key to enable a thicker deposit to be built up by electrodeposition, as for example from a potassium stannate bath. This deposit can be built up to the correct thickness for producing the desired quantities of niobium-tin.

After electroplating it may be advantageous to heat the tape more rapidly to 860° C. or above in order to improve the quality of the deposit and its adhesion to the niobium.

The coated tape may be manipulated and put into its final form, and then heated in order to convert it from tin-plated niobium into niobium-tin.

What I claim is:
1. A method of manufacturing an alloy superconductor comprising the steps of providing particles of the alloy constituents in a spiral jig comprising a spiral foil of a material having a coefficient of expansion similar to the alloy, compressing the particulate alloy constituents in said jig, and heating the compressed alloy constituents while held in said jig to form the alloy superconductor.
2. A method according to claim 1 wherein the alloy constituents comprise tin and niobium.
3. A method according to claim 1 wherein the constituents comprise particles of niobium-tin alloy.
4. A method according to claim 1 wherein the constituents comprise tin particles and niobium particles.
5. A method according to claim 1 wherein the constituents comprise particles of a partially reacted mixture of niobium and tin.
6. A method according to claim 2 wherein the compressed alloy constituents are heated to a temperature of from 900 to 1000° C. for from 1 to 16 hours.

References Cited

UNITED STATES PATENTS

| 2,289,152 | 7/1942 | Telkes | 75—208 |
| 2,331,909 | 10/1943 | Hensel et al. | 75—208 X |
| 2,466,432 | 4/1949 | Jenkins | 75—208 X |
| 2,913,819 | 11/1959 | Andreotti et al. | 75—208 X |
| 3,124,455 | 3/1964 | Buehler et al. | 29—599 X |
| 3,218,693 | 11/1965 | Allen et al. | 29—599 |
| 3,244,490 | 4/1966 | Saur. | |
| 3,258,828 | 7/1966 | Swartz | 29—599 |

JOHN F. CAMPBELL, Primary Examiner

PAIN M. COHEN, Assistant Examiner

U.S. Cl. X.R.

29—194, 420.5